(12) United States Patent
Pavel (10) Patent No.: US 11,814,789 B2
(45) Date of Patent: Nov. 14, 2023

(54) SAFE METAL FREE AND HOOKLESS WINCH ROPE

(71) Applicant: Matt Dustin Pavel, Kingston, TN (US)

(72) Inventor: Matt Dustin Pavel, Kingston, TN (US)

( * ) Notice: Subject to any disclaimer, the term of this patent is extended or adjusted under 35 U.S.C. 154(b) by 141 days.

(21) Appl. No.: 17/468,671

(22) Filed: Sep. 8, 2021

(65) Prior Publication Data

US 2022/0178074 A1 Jun. 9, 2022

Related U.S. Application Data

(60) Provisional application No. 63/122,399, filed on Dec. 7, 2020.

(51) Int. Cl.
*D07B 1/18* (2006.01)
*B60D 1/18* (2006.01)
*B66D 1/26* (2006.01)

(52) U.S. Cl.
CPC ............... *D07B 1/185* (2013.01); *B60D 1/18* (2013.01); *B66D 1/26* (2013.01); *D07B 2201/1004* (2013.01)

(58) Field of Classification Search
CPC ........................ D07B 1/185; B60D 1/18–187
See application file for complete search history.

(56) References Cited

U.S. PATENT DOCUMENTS

| 1,386,052 | A | * | 8/1921 | Duggan | B60D 1/187 280/480 |
|---|---|---|---|---|---|
| 1,572,771 | A | * | 2/1926 | Connelly | B60D 1/187 280/480 |
| 1,580,553 | A | * | 4/1926 | Brenny | A01K 1/064 54/24 |
| 1,924,992 | A | * | 8/1933 | Jasper | B60D 1/18 280/480 |
| 2,961,816 | A | * | 11/1960 | Reed | B68B 1/02 54/24 |
| 4,173,109 | A | * | 11/1979 | Hibbert | B68B 1/02 54/24 |
| 8,590,116 | B2 | * | 11/2013 | Dahl | D07B 1/18 294/74 |

(Continued)

FOREIGN PATENT DOCUMENTS

EP 3742019 A1 * 11/2020 ............. D07B 1/185

OTHER PUBLICATIONS

"Freedom Winch Line Promo—YouTube", https://www.youtube.com/watch?v=u-dDSvajnLw, Dec. 18, 2020 (Year: 2020).*

(Continued)

*Primary Examiner* — Shaun R Hurley
(74) *Attorney, Agent, or Firm* — Outlier Patent Attorneys, PLLC (57) ABSTRACT

A safe metal free and hookless winch rope includes a stopper knot formed at an end of the winch rope that is opposite an end of the winch rope intended to be wound around a winch, and a plurality of brummel style openings formed inline along at least a portion of the winch rope. The stopper knot can be selectively inserted into any brummel style opening of the plurality of brummel style openings to wrap around an object during a winch operation and the stopper knot will be securely held in the selected brummel style opening when the winch rope is under tension during the winch operation.

5 Claims, 9 Drawing Sheets

(56) References Cited

U.S. PATENT DOCUMENTS

| | | | | |
|---|---|---|---|---|
| 10,253,438 | B2* | 4/2019 | De Graaf | A01K 75/00 |
| 10,604,892 | B1* | 3/2020 | Caliri | D07B 1/148 |
| 2006/0075610 | A1* | 4/2006 | Buchanan | B65D 63/1018 |
| | | | | 24/300 |
| 2015/0351739 | A1* | 12/2015 | Napolitano | D07B 1/18 |
| | | | | 606/228 |
| 2020/0056312 | A1* | 2/2020 | Kiefer | D04C 3/48 |
| 2020/0130439 | A1* | 4/2020 | Najarro | B60D 1/52 |

OTHER PUBLICATIONS

"BleepinJeep Freedom Winch Line", https://bleepinjeep.com/product/freedomline/, retrieved from Internet Archive Feb. 27, 2021 (Year: 2021).*

* cited by examiner

SAFE METAL FREE AND HOOKLESS WINCH ROPE

CROSS-REFERENCE TO RELATED APPLICATIONS

This application claims the benefit of, and priority to, U.S. Provisional Patent Application No. 63/122,399, titled "Safe Metal Free and Hookless Winch Rope," filed on Dec. 7, 2020. That application, and the entire contents thereof, are incorporated by reference herein.

BACKGROUND

Field of the Art

This disclosure relates to a winch rope configured to be attached without using metal components or hooks, thereby providing a safe, metal free and hookless winch rope. More specifically, a winch rope comprising a synthetic rope is configured with a stopper knot and at least one and preferably a plurality of loops along at least a portion of the rope so that an appropriate loop in the rope can be selected to provide a winch attachment without using metal components.

Discussion of the State of the Art

Lines and ropes are used with winches in many applications including, for example, vehicles used for off-road driving, four-wheeling vehicles, and all-terrain-vehicles (ATVs). Currently, there are a number of solutions for off-road winching including some which attempt to incorporate safety to the winch line. The present inventors have recognized that these solutions fail to meet the needs of the industry because they all use metal components that are prone to fatigue and breakage, which can be flung at dangerously high speeds during a failure and cause serious bodily injury or death.

Other solutions attempt to increase safety in the form of a closed metal hook, but these solutions are similarly unsafe because they still involve metal, metal fatigue, and attendant safety concerns. Other solutions attempt to add safety by using beefier metal components or additional straps, but these attempts fail to meet industry needs because the components are heavy and there are more pieces to keep track of and to lose. Many times, winch operators will forego safety measures to get the job done faster, with little concern for safety. Additionally, using multiple pieces of equipment during winching operations increases the risk of danger since there are multiple points of possible failure and multiple components that can be set up incorrectly by the user. Additionally, using multiple pieces of equipment raises a risk that one or more components, which typically are not routinely tracked down until actually needed, are only recognized as being lost, missing, or misplaced at a time it is most needed.

The present inventor has recognized that, in winch applications such as off-road driving, it would be desirable to have a device that can winch heavy loads without using heavy metal parts that can cause serious bodily harm or death when components break or come loose and fly at high rates of speed. Such a solution would ideally require fewer parts to keep track of, thereby reducing the possibility of discovering, only when a winch is most needed, that one or more components have been lost or misplaced.

SUMMARY

The present invention eliminates the metal components often used as equipment in conventional winching procedures. The present invention includes a safe, metal-free and hook-less winch rope that comprises a synthetic rope configured with a stopper knot and at least one opening along the length of the rope. The stopper knot may be inserted into the opening to form a loop that is securely closed on itself. In exemplary embodiments, a plurality of openings are formed along at least a portion of the rope so that a closed loop of any appropriate size can be selectively configured based on the size of the object being used to wrap around during, for example, a winch procedure, or any other application involving a rope or line under tension, such as climbing, sailing, hammocking, camping, etc.

The present invention thereby provides a system that can winch heavy loads without the need for heavy metal parts that can cause serious bodily harm or death when they break or come loose and fly at high rates of speed. The winch rope of the present invention provides a winch device that is cheaper than the metal hooks and shackles currently available on the market.

The present invention provides a winch rope that is cheaper to make, lighter and safer to use, easier and faster to set up and implement, and provides a better overall user winch experience with fewer parts to keep track of, find, or possibly lose.

BRIEF DESCRIPTION OF THE DRAWING FIGURES

The accompanying drawings illustrate several exemplary embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The present invention provides a safe, metal-free and hook-free winch rope system. The discussion herein refers to winch ropes configured with features of the invention as a Safe Metal Free and Hookless Winch Rope, even if the entire length of the winch rope does not incorporate features of the invention. Indeed, as will be clearer from the following discussion, a section of Safe Metal Free and Hookless Winch Rope can be spliced onto the end of an existing synthetic winch rope thereby converting a conventional winch rope into a winch rope that is metal free and hookless.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The apparatus of the present invention, in an exemplary embodiment, is a winch rope configured to be selectively attached at one end to an object for the purpose of winching, without using any metal shackles or hooks. In other exemplary embodiments, both ends of the line have the same or similar looping system, as being better suited as a kinetic energy rope or tow rope. It is noted that the terms "rope" and "line" are used interchangeably in this disclosure. Although this disclosure has described using the present invention in the context of off-road driving, four-wheeling vehicles, ATVs, etc., this specific application is not intended as limiting, since the winch rope system of the present invention would be beneficial in many other applications including, for example, construction, rigging, logging, towing, sailing, and other activities in which winches are commonly employed. Therefore, even though the following description uses the term "winch rope", this terminology is not intended as limiting the invention.

Ropes made of synthetic materials have become popular in recent years for winching because such synthetic lines are lighter, stronger, and more flexible than corresponding diameter steel cable lines. Synthetic ropes or lines are made of synthetic fibers woven together in braided-style that permits openings to be made in-line with the rope using techniques well known in the art of rope making and a tool called a fid to be described shortly. Materials commonly used to make synthetic fibers for synthetic ropes include polypropylene, polyesters, nylon, UHMWPE (UltraHigh Molecular Weight Polyethylene) and Aramids such as Kevlar®, Technor®, and Vectran®, but the present invention does not rely upon any specific material choice.

Apparatus

Figure 1:
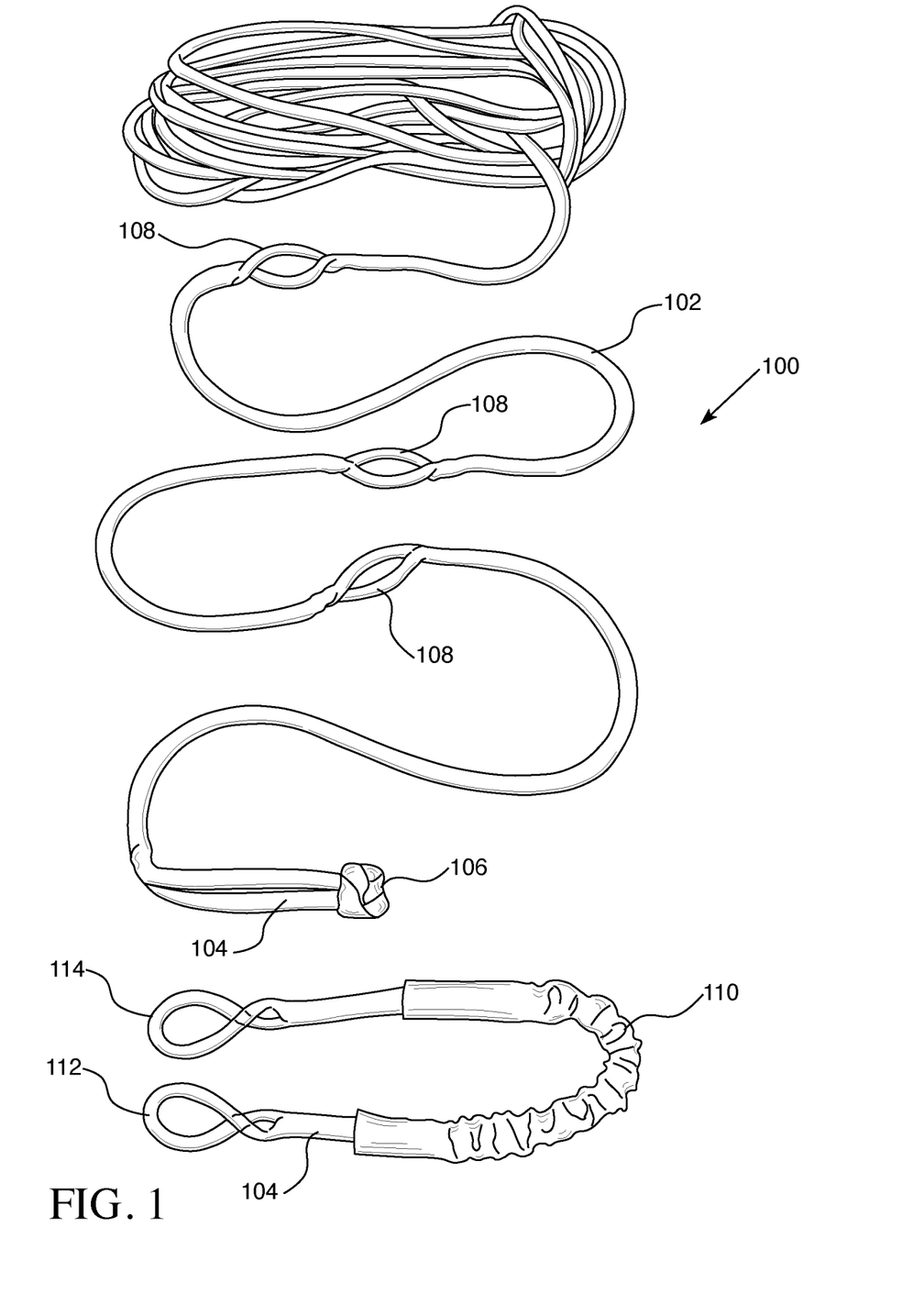
FIG. 1 illustrates a side view of a winch rope system in accordance with an embodiment of the present invention.

FIG. 1 illustrates the inventive apparatus 100 in accordance with an exemplary embodiment of the invention. In particular, FIG. 1 illustrates a winch line system 100 that includes a winch rope 102 of, for example, 100 feet or more. The winch rope 102 has a proximal end to be attached to a winch and a distal end 104. A stopper knot 106 is tied at the distal end 104 of the winch rope 102. The stopper knot 106 may be any style of knot capable of holding a loop of line material when the line is under tension. In one example, the stopper knot 106 is a button knot. There are many methods for tying button knots, including, for example, the Chinese button knot, the Celtic button knot, and the monkey fist. The Ashley Book of Knots contains over a hundred examples of button knots. However, it is also noted that any knot that could serve as a stopper knot can be used. Thus, even if the term "button knot" is often used in this description, the present invention is not intended as being limited to this single knot type since a number of different stopper knots are known in the art.

A plurality of openings 108 are formed along the length of the winch rope 102 proximal to the stopper knot 106. In one example, the openings 108 are Brummel style openings. Brummel style openings are individually formed using a fid, which is a conical tool with a dull point, traditionally used to work with rope and canvas in marlinespike seamanship. The end of the fid opposite the dull point has a longitudinal cavity into which a tip end of a rope is inserted, and then the dull point is used to penetrate laterally through the braided layers of the rope. When the fid is pushed/pulled through the rope, the end of the rope inserted in the fid cavity also gets pushed/pulled laterally through the rope and can then be inserted, again using the fid, lengthwise along the interior of the rope, to internally secure the end of the rope inside the rope. One technique of using a fid to splice into a rope is known as a locked brummel splice and is well known in the art of rope making. However, other splices are well known in the art, so the present invention is not limited to this single splicing technique. The brummel style openings 108 shown in FIG. 1 are formed by splicing each end of a short segment of rope into the main rope using a locked brummel splice, such that the two ends of the rope segment get fused into the main rope via a locked brummel splice at each end.

FIG. 1 exemplarily shows three brummel style openings 108 formed inline along the winch rope 102, but it should be clear that any number of such openings could be formed along the length of the winch rope 102.

The winch line system 100 of FIG. 1 includes a separate rope section 110 having brummel splices 112, 114 on each end. Since the two brummel splices 112, 114 are large enough for the stopper knot 106 to pass therethrough, the rope section 110 can be separated/detached from the winch rope 102. When attached to the winch rope 102, the rope section 110 can be easily wrapped around an object by merely slipping brummel splice 112 over the stopper knot 106, wrapping the rope section 110 around the object to be hitched, and then slipping the other brummel splice 114 over the stopper knot 106. Tightening the winch rope 102 will draw the two brummel splices 112, 114 against the stopper knot 106. One of the benefits of this system 100 is that the separate rope section 110 can be easily replaced if damaged.

Figure 2:
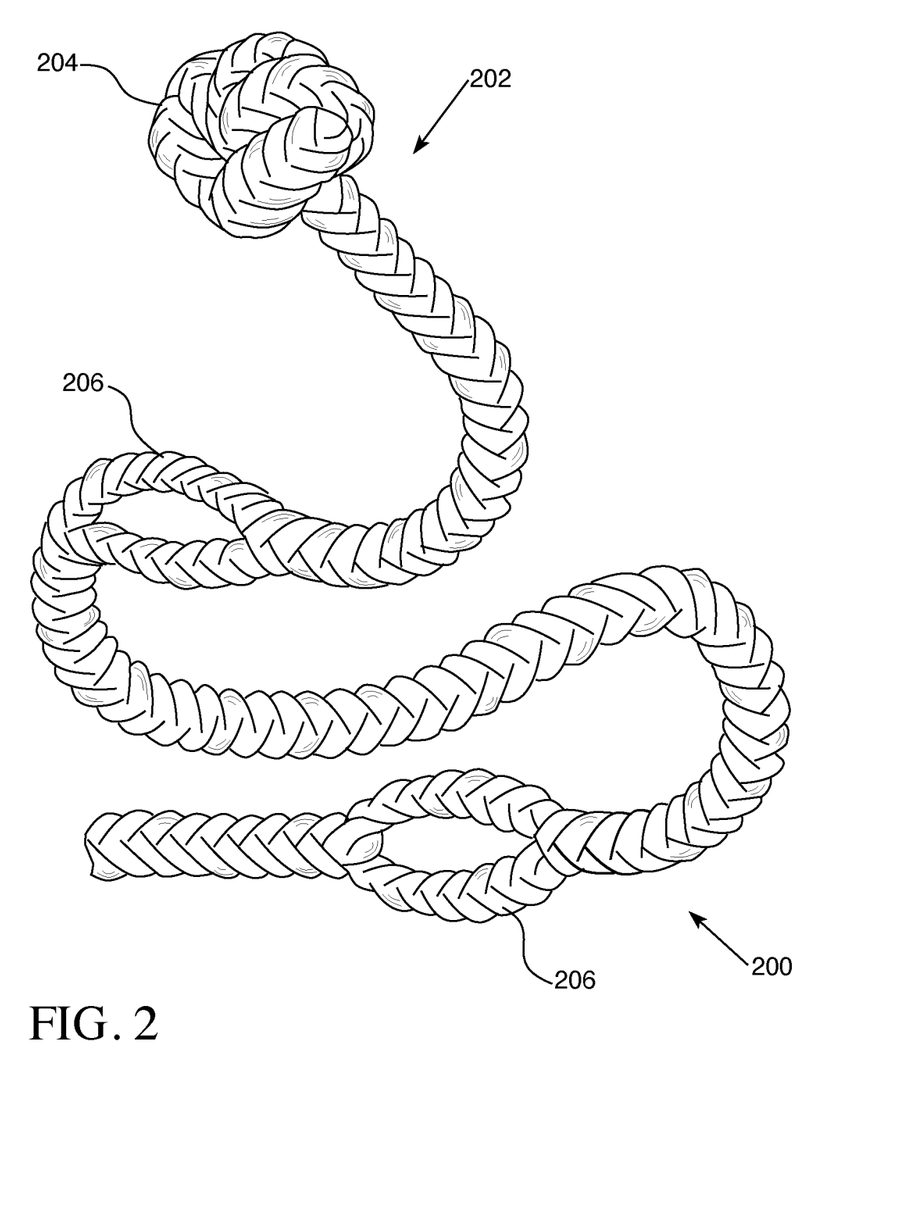
FIG. 2 illustrates a side view of a winch rope in accordance with another embodiment of the present invention.

FIG. 2 depicts another embodiment of a winch rope 200 that is similar to the embodiment in FIG. 1, but does not include the separate rope section. In particular, the winch rope 200 includes an elongate rope having a distal end 202. A stopper knot 204 is tied in the distal end 202 of the rope 200. Openings 206 are formed along the length of the rope 200 proximal to the stopper knot 206.

Figure 3:
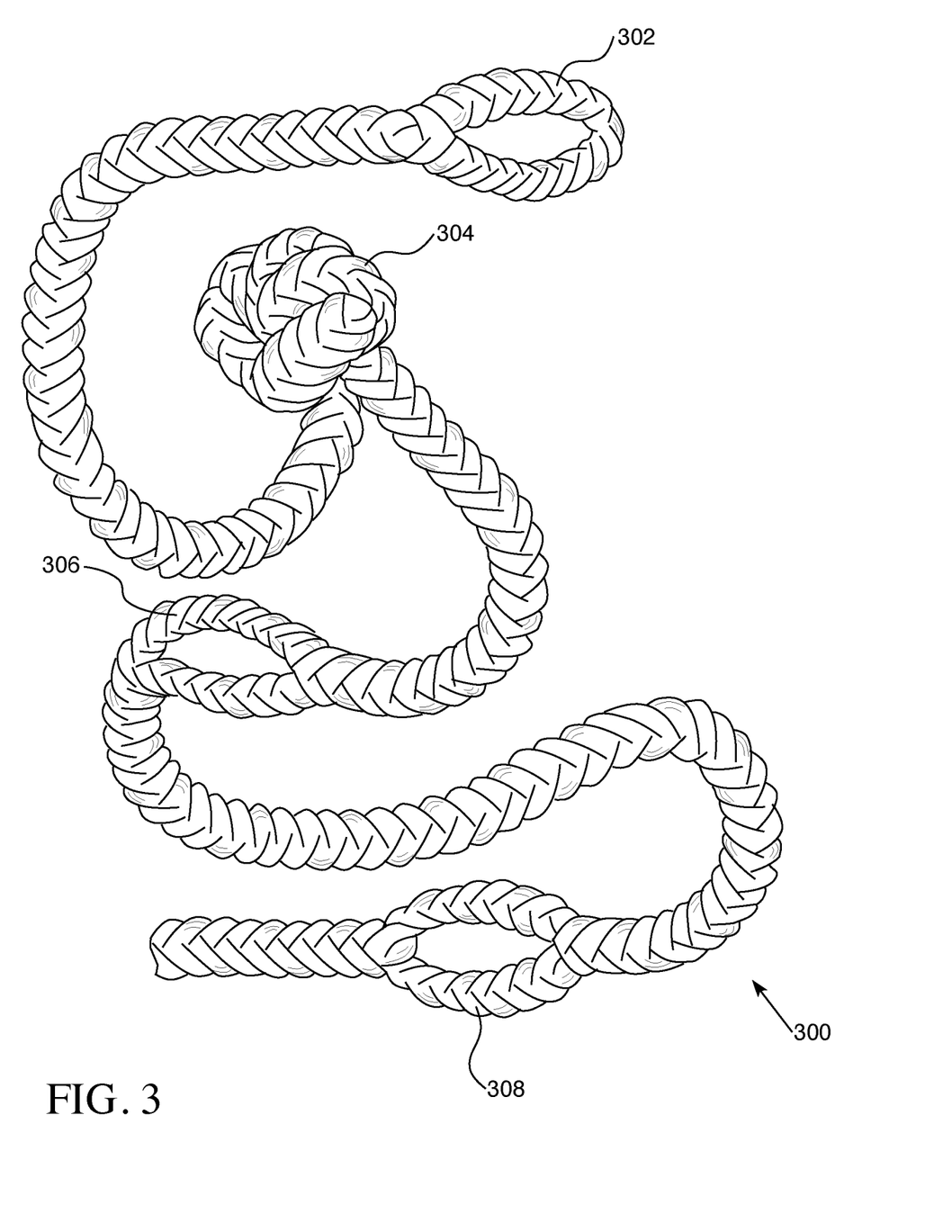
FIG. 3 is a side view of a winch rope in accordance with yet another embodiment of the present invention.

FIG. 3 shows a variation in which the winch rope 300 has a locked brummel splice loop 302 formed at the tip of the winch rope 300, with a button knot 304 formed a predetermined distance from the tip, and brummel style openings 306, 308 are then formed at predetermined distances inline along the rope 300. The locked brummel splice loop 302 can slide over the button knot 304 to form a self-tightening loop that acts as a hook or shackle which needs no metal components or external pieces to function. It should also be clear that the button knot 304 could also be inserted through inline brummel style opening 306 to wrap around a smaller diameter object such as a small tree trunk or through inline brummel style opening 308 around a larger diameter object such as a larger tree trunk. Additional inline brummel style openings could be incorporated along the length of the winch rope 300 or a predetermined portion of the rope length.

For example, in the exemplary configuration shown in FIG. 3, with inline openings (e.g., 306, 308) in the rope approximately every 12 inches, a button knot 304, and an additional loop 302 coming out of this button knot 304 on the end, and a stopper to keep the end from sucking into the winch fairlead. These components are connected as follows: starting at the beginning of the winch line there is a standard winch rope of 100 feet, every foot of rope there is an opening (e.g., 306, 308) where the button knot 304 at the end of the rope can be inserted to form a closed loop for winching. Thus, at the end of the winch line there is a large button knot 304 that is used to insert in these openings 306, 308 in the winch rope, to form a closed loop without using any metal parts. Also coming out of this button knot 304 on the end of the winch rope, in this exemplary embodiment, is another foot of rope with a loop 302 in the end, and its use is to hook onto the end button knot 304 for hooking onto smaller objects for the same reason of making a closed loop for winching purposes. It should further be noted that when the button knot 304 at the end of the winch line goes through any of the openings 302, 308, 306 in the winch line and tension is applied, the tension on the winch line acts as a closing device and keeps the knot from slipping out of the opening.

In one embodiment, a second stopper knot may be made available on the proximal end of the line.

Figure 4:
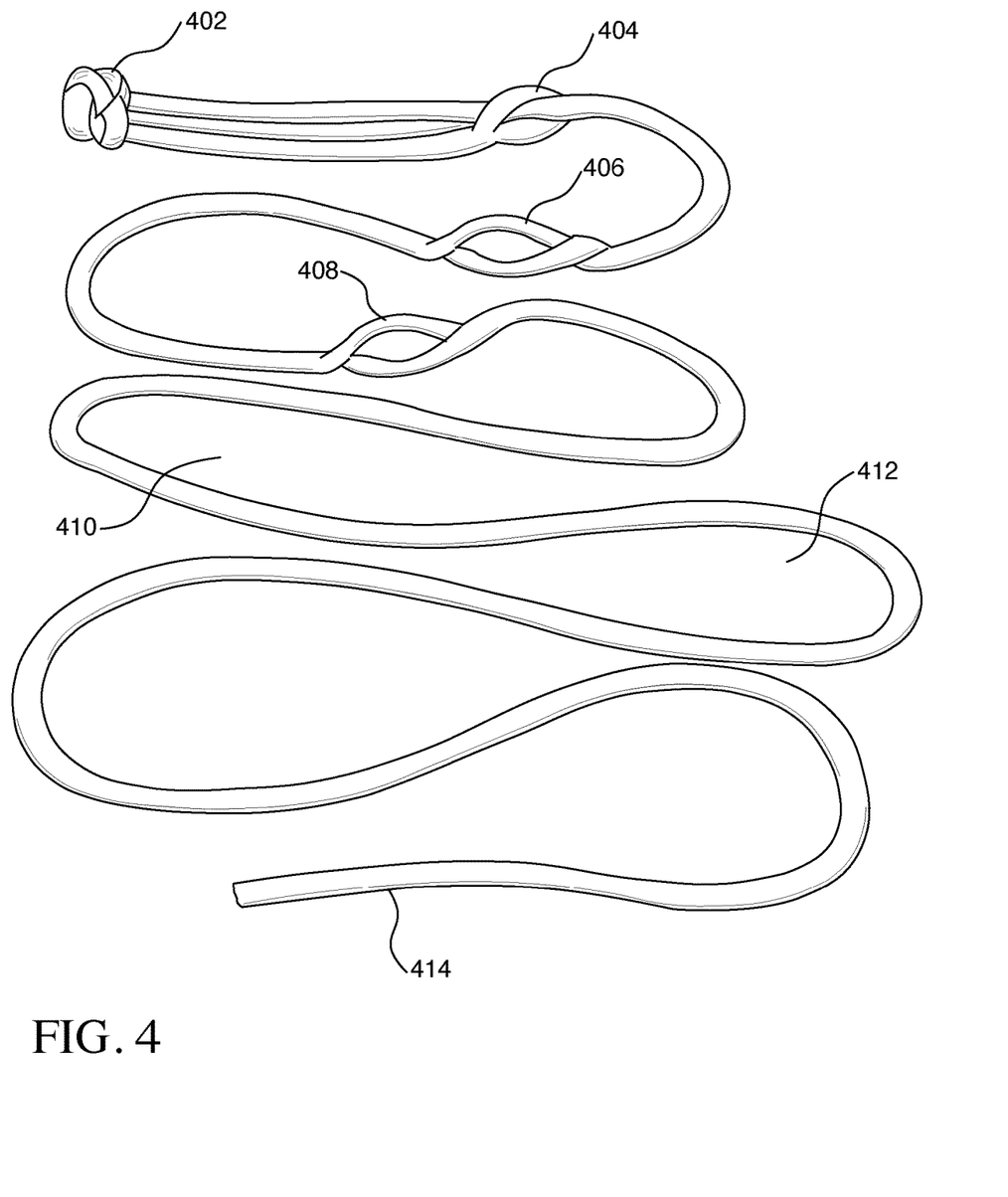
FIG. 4 illustrates an overview of an entire assembly of an exemplary embodiment.

FIG. 4 shows an exemplary embodiment with the locked brummel splice loop 404 slid over the button knot 402, as well as the two inline brummel style openings 406, 408. Additionally, FIG. 4 shows at points 410, 412 how an end section of rope having a button knot and a plurality of brummel style openings could be spliced/tapered into an existing winch rope 414. FIG. 4 thereby demonstrates how the present invention can be incorporated into an end of an existing winch rope 414 using a splicing technique in which the added rope segment containing the safe metal free and hookless winch rope of the present invention is tapered at the end and then spliced into an existing winch rope by burying it inside a length of the existing winch rope 414, using a fid tool.

Figure 5:
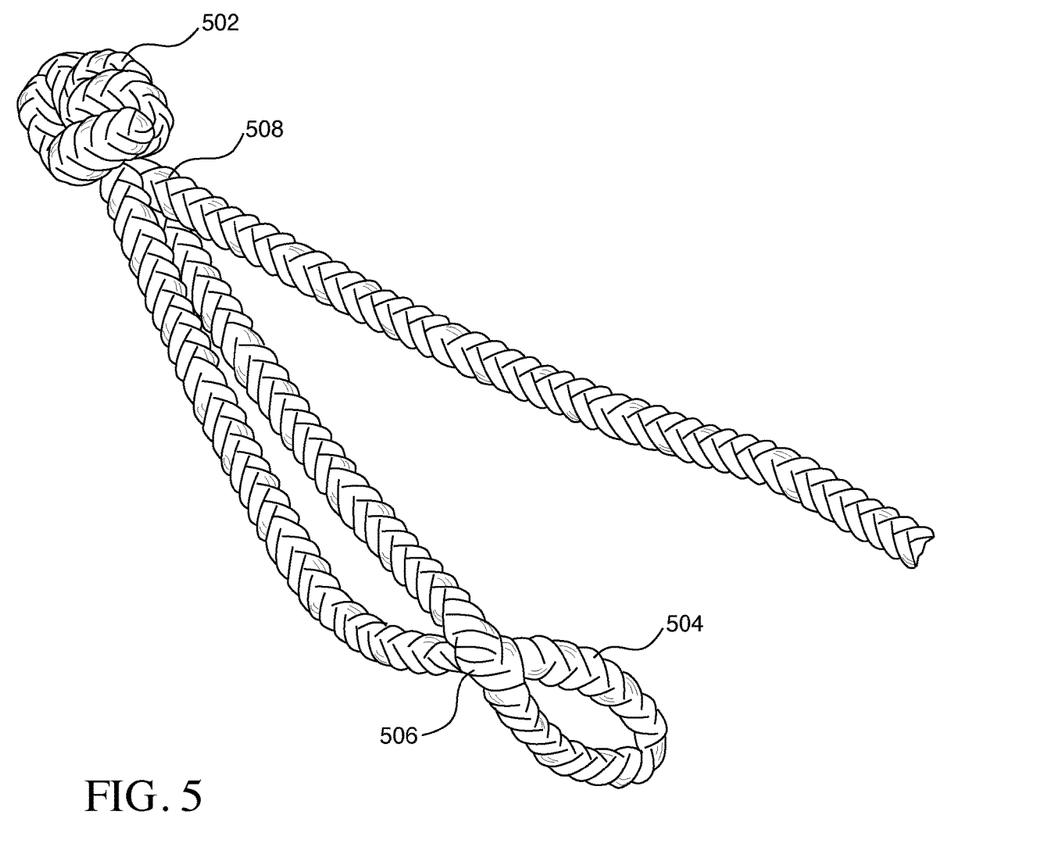
FIG. 5 illustrates a close up view of an exemplary looping system and knot.

FIG. 5 shows in detail a variation in which a small closure mechanism is incorporated at the end of the Safe Metal Free and Hookless Winch Rope invention. Button knot 502 is tied on the end of the device, and the self cinching loop mechanism 504 slides over the button knot 502 and self tightens under winching loads. Loop 504 slides over button knot 502 to enclose small areas such as a winch receiver or some other solid winch point. Point 506 shows where the loop 504 is sewn through the rope itself. Label 508 shows the other end of the rope leaving the button knot 502 and being spliced into the main rope by weaving through the interior of the main rope in a locked brummel manner. This locked brummel technique keeps the rope from slipping or coming apart by using friction to keep itself secure inside the interior of the main rope.

Figure 6:
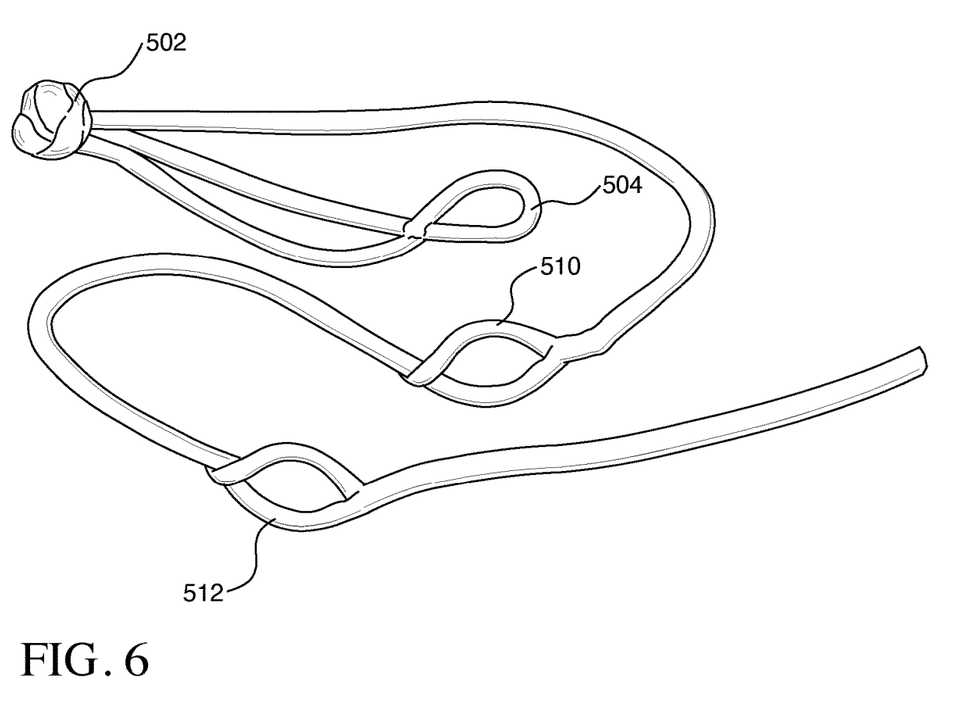
FIG. 6 illustrates a medium view of an exemplary device structure.

FIG. 6 shows a mid vantage view of the exemplary winch rope device shown in FIG. 5. Button knot 502 secures the end of the rope and creates the "hook" that can be inserted in any opening including loop 504 to wrap around small objects, loop 510 to wrap around medium sized objects, and loop 512 to wrap around larger objects. It should be clear that more openings could be added to the rope in locations that are proximal to the opening 508 to provide the ability to wrap around larger object sizes.

Figures 7, 8:
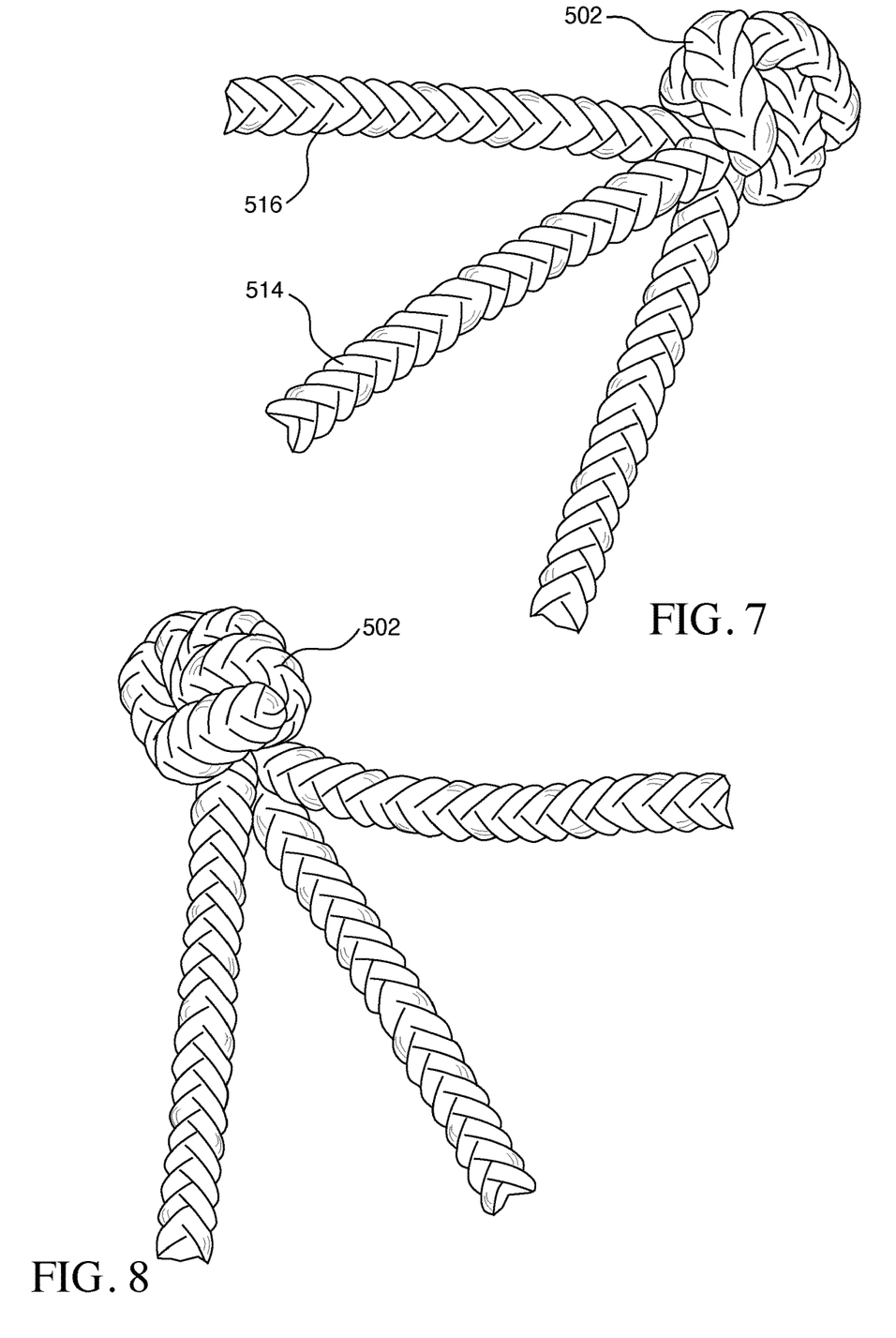
FIG. 7 illustrates a close up view of a knot and ends.
FIG. 8 illustrates a detail of a knot and locked splice.

FIG. 7 shows a close up view of the end of the metal free winch rope device of FIG. 5, including a close up view of button knot 502. Label 514 shows the locked brummel splice protruding from the button knot 502 and continuing down the main rope. Label 516 shows the loop making its way back around to the other side of the button knot 502.

FIG. 8 shows in closer detail the knotting and splicing of the winch rope device shown in FIG. 5. FIG. 8 shows the button knot 502 from the opposite side of the knot from that shown in FIG. 7. FIG. 7 shows the routing of the button knot 502, and label 514 shows a close up of the two ropes as they exit the button knot 502 and merge together in a splice, one rope inside the other.

Figure 9:
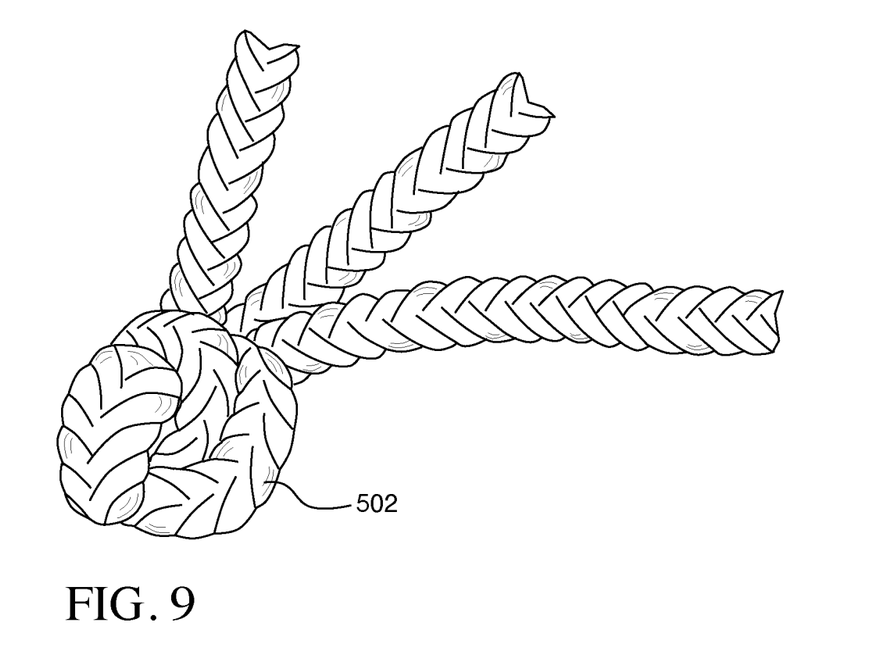
FIG. 9 illustrates a detail of a knot.

FIG. 9 shows in detail the button knot 502 which becomes the so-called "hook" when it is placed through the openings in any other loop part of the winching rope.

Figure 10:
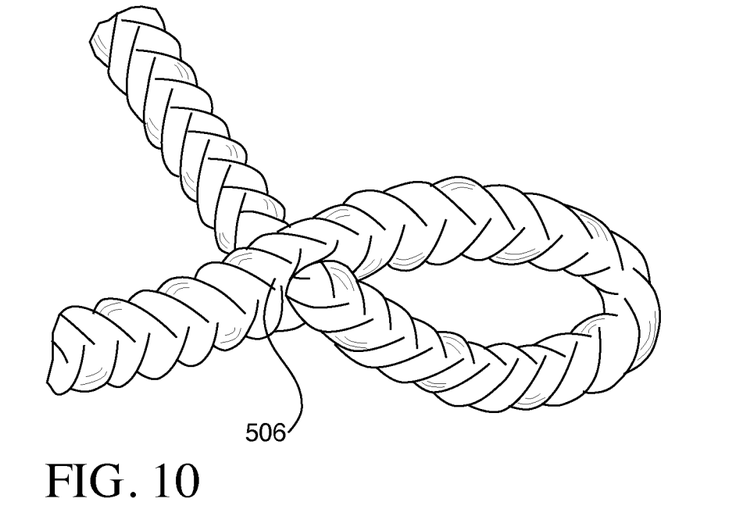
FIG. 10 illustrates a detail of a self-cinching loop.

FIG. 10 shows the split loop 506 of the exemplary configuration shown in FIG. 5, as one side pierces the other forming a self-tightening loop that engages the button knot 502 in a way that it cannot come apart when under load.

Figure 11:
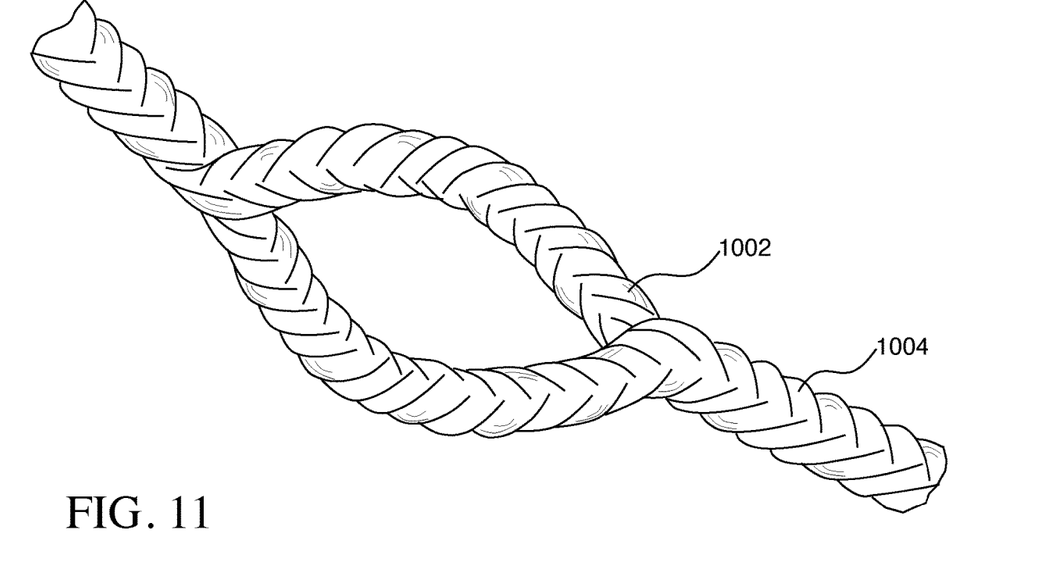
FIG. 11 illustrates a detail of a self-cinching opening.

FIG. 11 shows a close up of the inline loop openings, such as 108 in FIG. 1, and 206 in FIG. 2, 306, 308 in FIG. 3, 406, 408 in FIG. 4, and 510, 512 in FIG. 6. As briefly explained earlier, in making a brummel style loop opening, rope 1002 penetrates through rope 1004, which is then spliced into the interior of rope 1004, and similar penetrating and splicing occurs at the other end of the loop opening. With the two ropes 1002, 1004 splicing through each other, a locking force is formed which keeps the loop in place without collapsing on itself. The loop opening will always be able to accept the button knot shown in FIG. 9 as the loop will never slip closed when there is slack in the rope. Yet, when pulling pressure is applied on the rope, the loop will close and the button knot will not be able to escape the loop.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other varia-tion thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A winch rope system, comprising:
an elongate winch rope having a proximal end and a distal end, wherein the proximal end is configured to be attached to a winch;
a stopper knot formed at the distal end of the winch rope;
a plurality of brummel style openings formed inline along at least a portion of the winch rope that is proximal to the stopper knot;
a second section of rope that is separate from the elongate winch rope; and
a brummel splice formed on each end of the second section of rope, wherein the brummel splices are configured to slide over the stopper knot, wherein the stopper knot is configured to be selectively inserted into any brummel style opening of the plurality of brummel style openings to wrap around an object during a winch operation and the stopper knot will be securely held in the selected brummel style opening when the winch rope is under tension during the winch operation.

2. The winch rope system of claim 1, as comprising a synthetic material braided in layers to form the rope.

3. The winch rope system of claim 1, wherein the stopper knot is a button knot.

4. The winch rope system of claim 1, wherein the stopper knot is formed such that a section of rope extends out of the stopper knot and a brummel splice is formed in the section of rope extending out of the stopper knot, such that the section of rope extending out of the stopper knot is configured to be wrapped around an object during the winch operation and the brummel splice is configured to slide over the stopper knot and be secured in place when the winch rope is under tension during the winch operation.

5. The winch rope system of claim 1, wherein the stopper knot is formed such that a section of rope extends out of the stopper knot and a loop is formed in the section of rope extending out of the stopper knot by having the rope penetrate itself to form the loop, such that the section of rope extending out of the stopper knot is configured to be wrapped around an object during the winch operation and the loop formed in the section of rope extending out of the stopper knot is configured to slide over the stopper knot and be secured in place when the winch rope is under tension during the winch operation.

* * * * *